(12) United States Patent
Carson et al.

(10) Patent No.: US 11,022,724 B2
(45) Date of Patent: Jun. 1, 2021

(54) SPATIAL MULTIPLEXING OF LENS ARRAYS WITH SURFACE-EMITTING LASERS FOR MULTI-ZONE ILLUMINATION

(71) Applicant: Lumentum Operations LLC, San Jose, CA (US)

(72) Inventors: Richard F. Carson, Albuquerque, NM (US); Preethi Dacha, Albuquerque, NM (US); Mial E. Warren, Albuquerque, NM (US)

(73) Assignee: Lumentum Operations LLC, San Jose, CA (US)

( * ) Notice: Subject to any disclaimer, the term of this patent is extended or adjusted under 35 U.S.C. 154(b) by 0 days.

(21) Appl. No.: 16/828,815

(22) Filed: Mar. 24, 2020

(65) Prior Publication Data

US 2020/0310005 A1    Oct. 1, 2020

Related U.S. Application Data

(60) Provisional application No. 62/823,122, filed on Mar. 25, 2019.

(51) Int. Cl.
*G02B 3/00*     (2006.01)
*H04B 10/50*    (2013.01)
*H04J 14/00*    (2006.01)

(52) U.S. Cl.
CPC ......... *G02B 3/0062* (2013.01); *G02B 3/0006* (2013.01); *H04B 10/502* (2013.01); *H04J 14/00* (2013.01)

(58) Field of Classification Search
CPC .. G02B 3/0062; G02B 3/0006; H04B 10/502; H04J 14/00
(Continued)

(56) References Cited

U.S. PATENT DOCUMENTS

| 8,613,536 B2 | 12/2013 | Joseph et al. |
| 8,979,338 B2 | 3/2015  | Joseph et al. |

(Continued)

FOREIGN PATENT DOCUMENTS

WO    WO 2019/036383 A1    2/2019

OTHER PUBLICATIONS

International Patent Application No. PCT/US2020/024516; Int'l Search Report and the Written Opinion; dated Jun. 30, 2020; 15 pages.

*Primary Examiner* — Dalzid E Singh

(74) *Attorney, Agent, or Firm* — Harrity & Harrity, LLP

(57) ABSTRACT

Systems, methods, and devices disclosed herein relate to optical assemblies for spatial multiplexing, multi-zone illumination, and optical assemblies. In embodiments, light source arrays are aligned with one or more micro-lens assemblies to generate a specific field of illumination. In embodiments, surface-emitting light sources may be light-emitting diodes and/or surface-emitting lasers. The micro-lens array may be aligned with the light source arrays, on-axis or off-axis to a principal axis of corresponding lenses such that the light sources may be expanded to a desired divergence and field of illumination. In embodiments, multiple light sources may be combined to increase power output for a specific area of the field of illumination, and light sources may be driven independently depending on intended illumination.

20 Claims, 7 Drawing Sheets

(58) Field of Classification Search
USPC .......................................................... 398/43
See application file for complete search history.

(56) References Cited

U.S. PATENT DOCUMENTS

| | | | |
|---|---|---|---|
| 8,995,485 B2 | 3/2015 | Joseph et al. | |
| 8,995,493 B2 | 3/2015 | Joseph et al. | |
| 9,065,239 B2 | 6/2015 | Joseph et al. | |
| 9,232,592 B2 | 1/2016 | Lear | |
| 9,746,369 B2 | 8/2017 | Shpunt et al. | |
| 10,038,304 B2 | 7/2018 | Joseph | |
| 10,243,324 B2 | 3/2019 | Brocato et al. | |
| 10,244,181 B2 | 3/2019 | Warren | |
| 10,530,128 B2 | 1/2020 | Carson et al. | |
| 2008/0317403 A1* | 12/2008 | Kubo | G02B 6/32 |
| | | | 385/14 |
| 2011/0279903 A1 | 11/2011 | Wiedemann et al. | |
| 2012/0002917 A1* | 1/2012 | Colbourne | G02B 6/356 |
| | | | 385/17 |
| 2013/0266326 A1* | 10/2013 | Joseph | H04B 10/1141 |
| | | | 398/130 |
| 2018/0024372 A1* | 1/2018 | Huang | G02B 30/24 |
| | | | 359/463 |
| 2018/0157158 A1* | 6/2018 | Yaras | H04N 9/3164 |
| 2018/0267214 A1 | 9/2018 | Rossi et al. | |
| 2019/0033429 A1* | 1/2019 | Donovan | G01S 17/06 |
| 2019/0268068 A1 | 8/2019 | Dacha et al. | |
| 2020/0284988 A1* | 9/2020 | Tanaka | G02B 6/327 |

* cited by examiner

SPATIAL MULTIPLEXING OF LENS ARRAYS WITH SURFACE-EMITTING LASERS FOR MULTI-ZONE ILLUMINATION

CROSS REFERENCE TO RELATED APPLICATIONS

This application claims benefit under 35 U.S.C. § 119(e) of Provisional U.S. Patent Application No. 62/823,122, filed Mar. 25, 2019, the contents of which is incorporated herein by reference in its entirety.

TECHNICAL FIELD

This disclosure generally relates to spatial multiplexing, and more specifically, to spatial multiplexing with surface-emitting lasers.

BACKGROUND

Surface-emitting light sources can be configured in one and two-dimensional arrays and integrated with micro-lens arrays or arrays of other optical elements for optical communications applications. One such optical application is spatial multiplexing, wherein optical data signals are wirelessly transmitted to a receiver via arrangements of light sources and optical elements. Other applications include visible or IR illumination, structured lighting, IR heating and specialized optical designs. In many configurations and applications of surface-emitting light sources, like uniform illumination applications, the pitch of each micro-lens is similar to that of the light source array, so that each light source has its own micro-lens.

One drawback of these systems is that the micro-lens arrays typically have a larger pitch than the minimum pitch of the light sources in the source array. In addition, the beam from the light sources expands as it propagates toward the micro-lens array, thus requiring the micro-lens to be larger. This is a significant penalty in utilization of the expensive light source chip area.

In other optical applications a single micro-lens array is not sufficient to meet specific characteristics and requirements of the system, such as when a narrow divergence beam is required from a source or array of sources. Most surface-emitting light sources, have relatively large beam divergence, from a few degrees to 90 degrees or more, which is impractical for many applications, and have not yet been addressed. Moreover, while a single micro-lens may somewhat reduce divergence, depending on the source area, there is a limit defined by the light source's characteristics, especially the effective source diameter and by the focal length of the micro-lens. In some cases, the micro-lens may be used to increase the divergence of the source by being configured to sharply focus the light near the emission surface.

SUMMARY

The present disclosure relates to optical systems, methods, and devices, comprising various geometries of arrays of micro-lenses and surface-emitting light sources to accomplish various optical assemblies, such as spatial multiplexing and multi-zone illumination. In embodiments, the surface-emitting light sources, may be light-emitting diodes and vertical cavity surface-emitting lasers.

In various embodiments, one or more arrays of micro-lenses may be aligned to a plurality of light sources, i.e., a light source array, such that light sources are offset relative to a principal axis of the micro-lens array, and emitted light beams propagate from a normal axis of each light source through the lens array. Multiple light sources may be offset from a principal axis of the same micro-lens, such that emitted beams through the same micro-lens propagate in different directions.

The array of light sources may comprise a plurality of subsets of light sources, which in various embodiments, may be offset relative to specific micro-lenses in the one or more arrays. The subsets and micro-lens arrays may be aligned such that one or more emitted light beams from the source combine after passing through the micro-lens array(s), thus increasing power of the combined beam. In such embodiments, the positioning of light source subsets relative to one or more corresponding micro-lenses may be repeated. In this manner, similar patterns (e.g., zones) of illumination may be realized.

In embodiments one or more light sources and/or subsets of light sources may be independently electrically connected from other light sources and/or subsets of light sources. Accordingly, a plurality of light sources may be independently illuminated such that light beams are sequentially propagated through the one or more micro-lenses.

BRIEF DESCRIPTION OF THE DRAWINGS

The drawings are provided to illustrate example embodiments described herein and are not intended to limit the scope of the disclosure.

Various non-limiting embodiments are further described with reference to the accompanying drawings in which.

DETAILED DESCRIPTION OF ILLUSTRATIVE EMBODIMENTS

Various aspects of the present disclosure described herein in are generally directed to devices, systems and methods for, among other things, spatial multiplexing of optical communications using lens arrays and one or more light sources. In embodiments, the light sources may be an array of light sources, such as light-emitting diodes and vertical cavity surface-emitting lasers (VCSELs). Micro-lenses may be spherical lenses, cylindrical lenses, diffractive optical elements, including Fresnel lenses, or other types comprising any of a plurality of characteristics (e.g., concavity, convexity, focal length, size, etc.) to obtain the desired field of illumination.

Figure 1A:
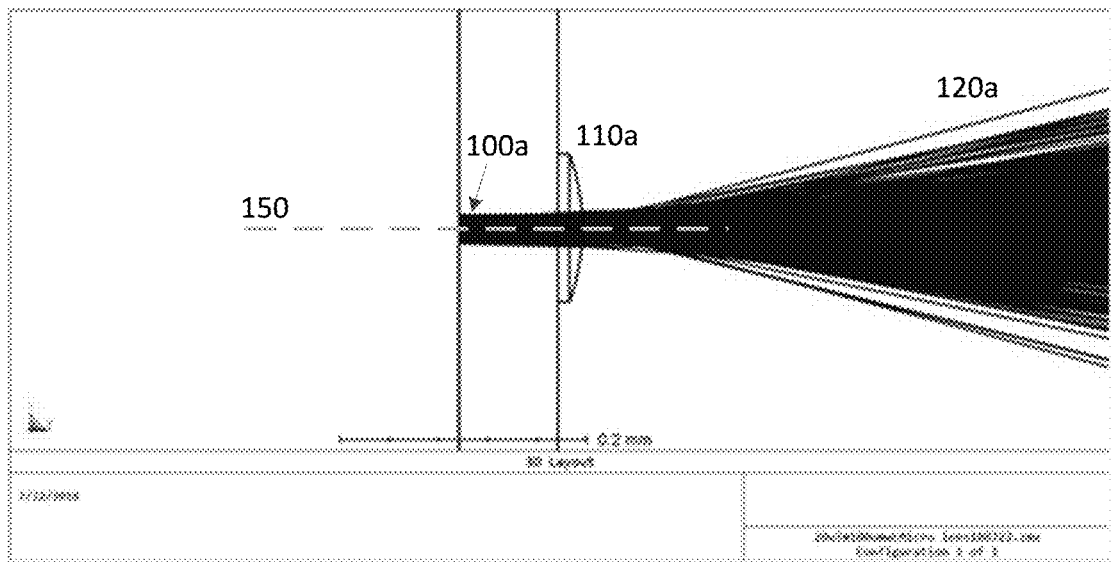
FIG. 1A illustrates a light source aligned on-axis with a micro-lens.
Figure 1B:
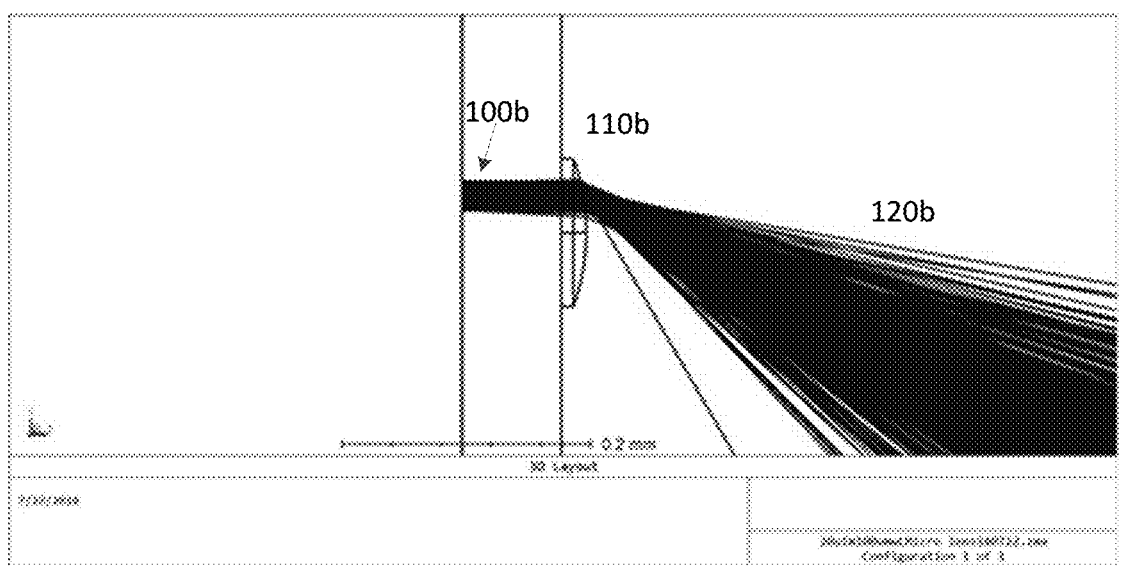
FIG. 1B illustrates a light source aligned off-axis with a micro-lens.

FIGS. 1A and 1B illustrate examples of where a single light source may be aligned with a single micro-lens. In FIG. 1A, the light source 100a may be aligned with the principal axis 150 of the micro-lens 110a, while FIG. 1B depicts a light source 100b offset from the principal axis of the lens 110b. In various embodiments herein, the light source is a surface-emitting light source, aligned to vertically emit light along an optical axis of the lens, but other light sources may be utilized, as further described herein. The positioning of the light source relative to the lens, i.e., an offset from the principal axis of the lens, alters the divergence of the light beams 120a and 120b, after passing through the lens. As seen by the emitted beam spread 120a in the example depicted in FIG. 1A, an alignment of the light source 100a with the principal axis of the micro-lens 110a results in an evenly diverging beam spread 120a, in the same direction as the light emission from the light source 100a.

The degree of offset of the light source's positioning relative to the lens' principal axis can alter both the divergence and the direction of the beam spread after the light passes through the lens array. As depicted in FIG. 1B, the light source 100b is vertically shifted such that the light beam enters an upper half of the lens array 110b, and results in a downward, diverging beam spread 120b.

FIGS. 1A and 1B depict a 0.08 mm spacing between the light source and the lens array. In other embodiments, the distance between the light source and lens array may be adjusted, depending on the desired divergence of the beam spread after passing through the lens array. In addition, while FIGS. 1A and 1B, along with other embodiments discussed herein, depict the axis of the light beam being substantially parallel to a principal axis of the lens array, it will be appreciated that, like the distance between the light source and lens array, the angle or offset between the light source axis and the optical axes of the lens array may be adjusted depending upon the desired beam divergence and direction.

The light source, as described herein may be a single light source, such as a diode or VCSEL, as well as a one or two-dimensional arrays of a light source. In embodiments, the light source and the micro-lens are positioned close to each other, to minimize the divergence of the light beam from the light source prior to passing through the micro-lens. In embodiments, the light source and lens may be positioned less than 0.1 mm apart from each other.

Figure 2:
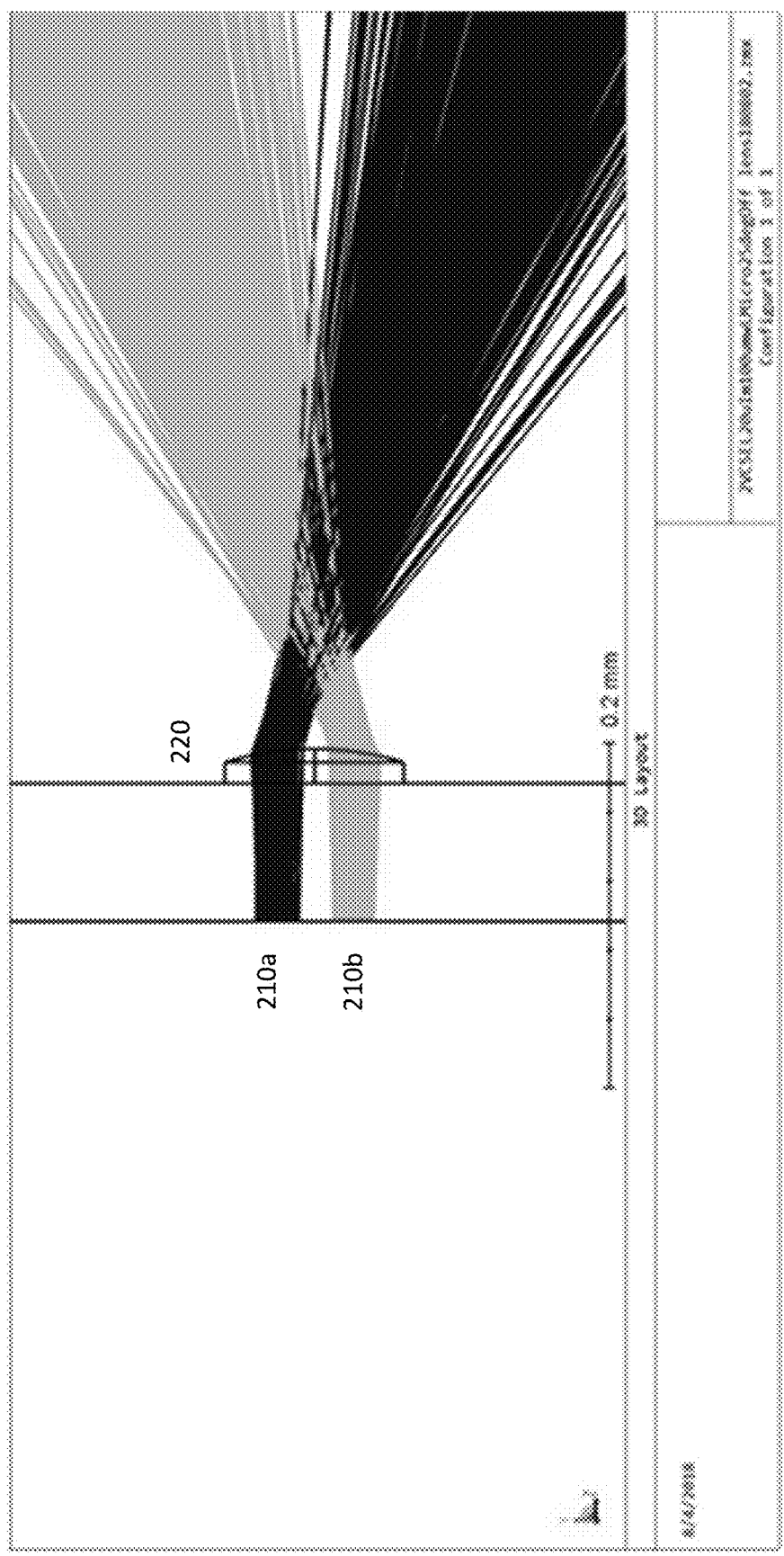
FIG. 2 illustrates a plurality of light sources aligned off-axis with a micro-lens.

FIG. 2 illustrates an embodiment comprising a plurality of light sources 210a, 210b aligned with a single micro-lens array 220. This arrangement may be utilized in various configurations, such as the embodiments illustrated in FIGS. 5-6, and embodiments combining multiple light sources and lens arrays.

In FIG. 2, the two depicted light sources are aligned with the lens array such that the resulting light beams are deflected in opposite directions. Each light source is offset relative to the principal axis of the micro-lens and propagates light substantially parallel to a principal axis of the micro-lens. The light source positioning offset relative to the principal axis of the micro-lens alters the degree of divergence as the light passes through the micro-lens 220

In embodiments, light source 210a, 210b may form a single light source array, or be a part of a separate light source arrays. In any case, the light sources may be electrically connected, and powered together, or be electrically independent. In one example, the light sources may be driven independently to individually address two separated zones. Alternatively, the plurality of light sources may be driven together or independently, depending on the desired field of illumination. The alignment of the light sources relative to the micro-lens, including the distance between the light sources and the micro-lens, may also be adjusted. In such examples, the light sources are aligned substantially parallel to a principal axis the lens array, or at varying angles depending one or more considerations including the desired field of illumination, the type of micro-lens, and the focal length of the lens.

Offsetting the source from the micro-lens axis allows for the spatial multiplexing of multiple lasers for a single lens. In this case, at least some of the micro-lenses will be offset, depending on the size of the micro-lens relative to the source dimensions and minimum pitch in the source array. This can be a case where all of the light sources going through the same lens may be on together when the offsets are being used to shape the combined beam output. It can also be a case where the sources are being independently driven so that the same micro-lens can send beams in different directions based on the offset from the lens axis of each light source that is turned on. More than one source can be turned on together in some applications. This allows for more compact designs through efficient use of the larger pitch micro-lens area.

In other configurations, such as specialized applications of those assemblies, the light sources under the micro-lenses are addressed individually or in groups, and the optical axis of the source is deliberately offset from the micro-lens optical axis to propagate the light at a non-normal angle to the array. Then the micro-lens array can be used to shape the beam output of the source array to cover a camera field of view or other applications. In addition, by addressing the individual sources or groups of sources that have different optical axis offsets, light may be directed in different directions at different times. This can be the basis of an all solid-state scanning capability by sequentially switching from zone to zone.

Figure 3A:
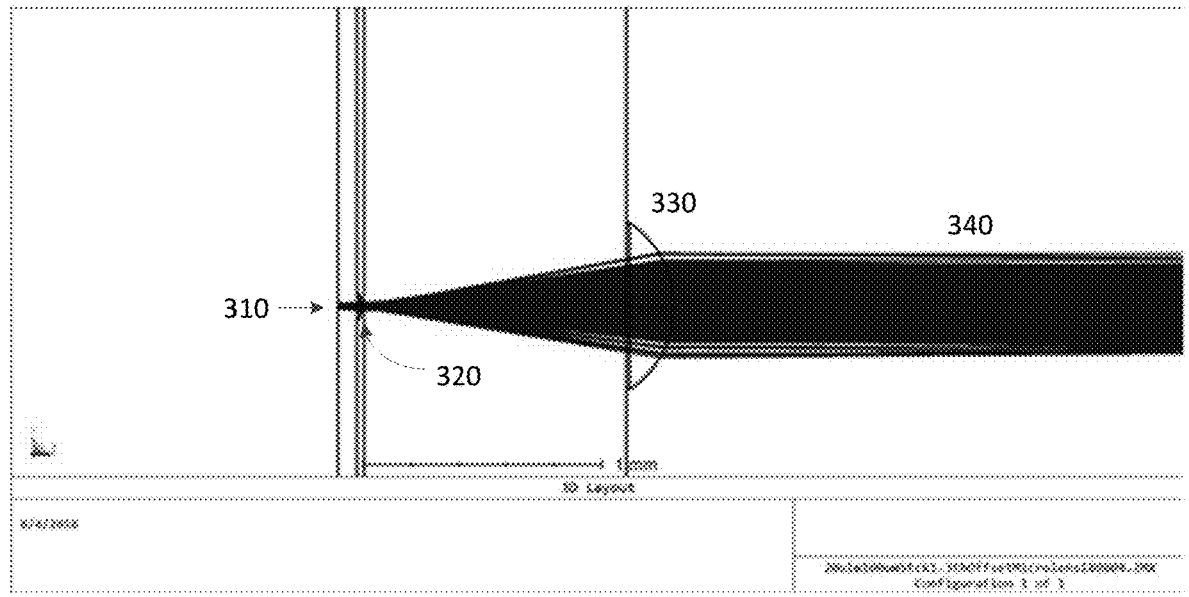
FIG. 3A illustrates a light source aligned on-axis with a plurality of micro-lenses.
Figure 3B:
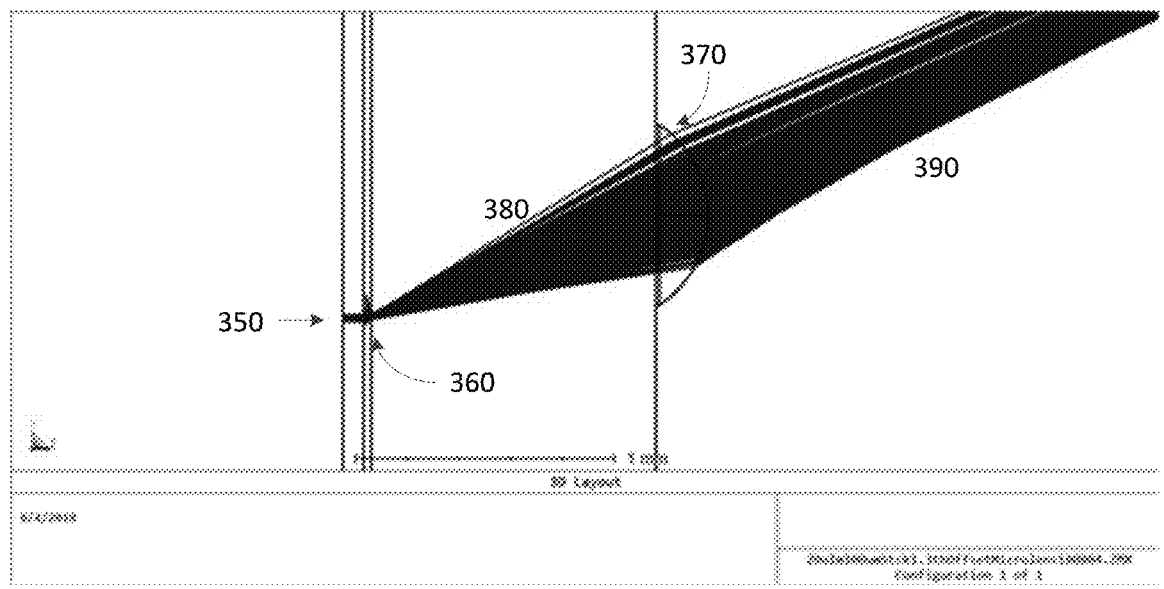
FIG. 3B illustrates a light source aligned off-axis with a plurality of micro-lenses.

FIGS. 3A and 3B illustrate arrangements comprising a light source used with a plurality of micro-lenses. In a case where divergence needs to be narrower, a second lens can act as a beam expander to give much smaller divergence values, down to a fraction of a degree. The source, transmitted through the first micro-lens, can also be offset relative to the second lens, so that the beam is further tilted off-axis. This effect is less dramatic than the divergence decrease, assuming the first micro-lens is shorter focal length than the second lens, but can provide useful additional design freedom. In this case, not only can multiple light sources be multiplexed through the same first micro-lens, the outputs of multiple first micro-lenses can be multiplexed through the same second lens, further increasing the efficient use of the device area.

In FIG. 3A, light source 310 is aligned on-axis with a principal axis of two micro-lenses 320, 330. The micro-lenses act as a beam expander, with the first lens 320 increasing the divergence of the beam, and the second lens 330 collimating and reducing divergence of the beam such that the resulting beam 340 and its field of illumination are significantly greater than the initial beam emitted from the light source.

In FIG. 3B, the light source 350 is shifted off-axis to the principal axis of the first micro-lens 360 and the first micro-lens 360 is shifted off-axis from the principal axis of the second micro-lens 370. Similar to FIG. 3A, the first micro-lens array 360 expands the beam 380, while the second micro-lens 370 decreases the divergence of the resulting beam 390. However, the off-axis alignment of the second micro-lens 370 also increases the deflection angle of the beam 390. By adjusting the alignment of the light source and the plurality of micro-lenses, the potential area that may be reached by the light source's field of illumination is significantly increased.

In embodiments, the light sources 310 and 350 may be an array comprising a plurality of light sources, and the depicted micro-lenses may each be an array of micro-lenses, each receiving light beams from one or more of the light sources. In various embodiments of micro-lens arrays and light source arrays, the combined field of illumination may be similar to the beam spreads 340 and 390, depending on the specific orientation and alignment of various light sources and arrays.

Additionally, the size and type of the lens arrays, and the distances between the lens arrays may be adjusted based on the desired size and position of the resulting field of illumination. In other words, the relative differences between the light source, first lens array, and second lens array may be varied depending on the direction and size of the desired field of illumination. In FIGS. 3A and 3B, the distance between the light source and the first lens array is less than 0.20 mm, and the distance the first and second lens arrays are over 1 mm. It will also be appreciated that the configuration of light sources and lens arrays are not limited to those depicted, and that the orientations between components may also be varied.

Figure 4:
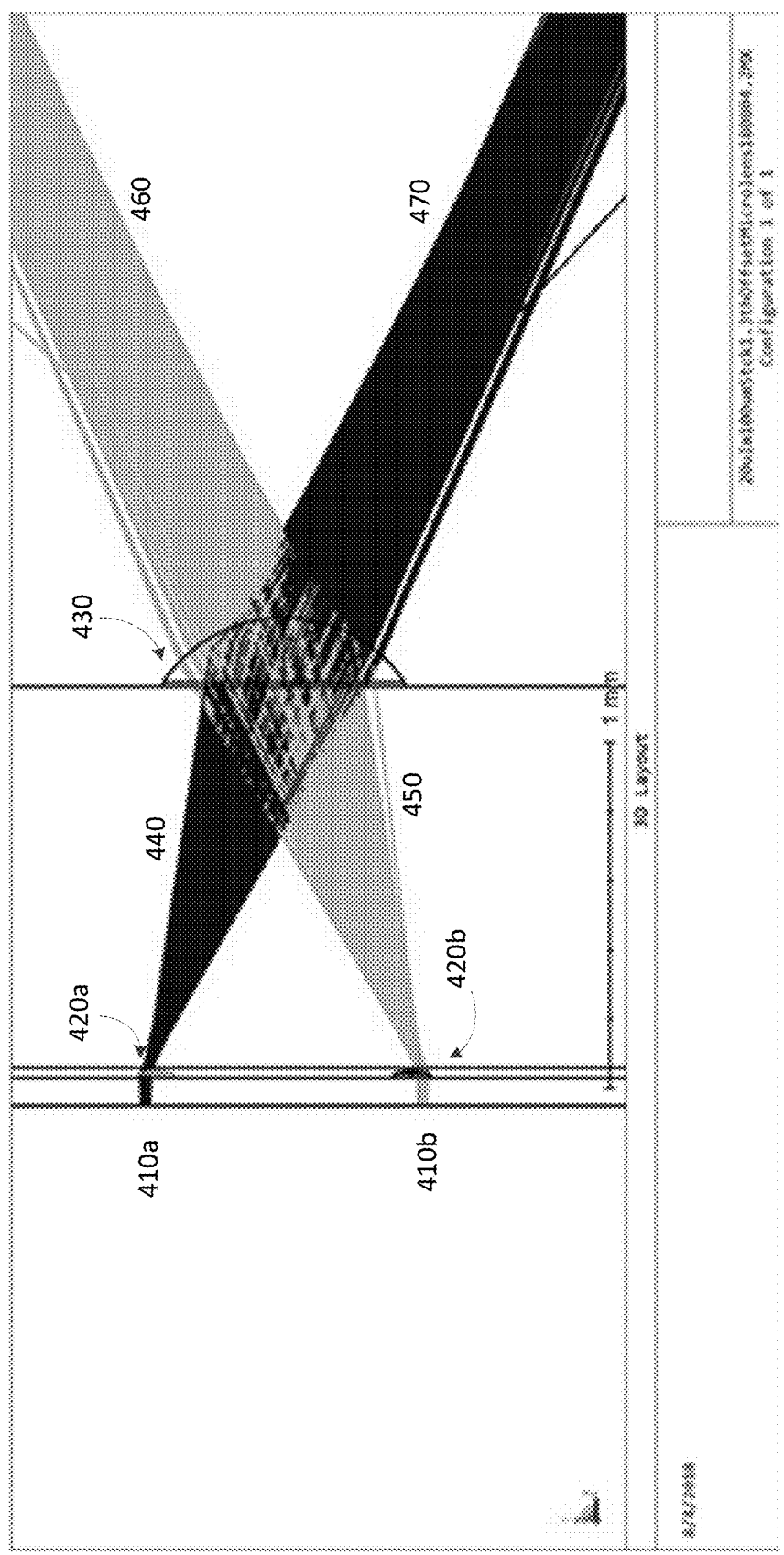
FIG. 4 illustrates a configuration comprising a plurality of light sources aligned with a plurality of micro-lenses.

FIG. 4 illustrates another configuration, which comprises a plurality of light sources and a plurality of micro-lenses. Two light sources, e.g., VCSELs, 410a and 410b, are individually aligned with separate, first micro-lenses, 420a and 420b, respectively, and the resulting diverging beams pass through a second micro-lens 430. As discussed herein, the light sources may be independently or concurrently driven, depending on the desired field of illumination.

In the depicted example, each light source, 410a and 410b, is shifted off-axis from a principal optical axis of their respective first micro-lenses 420a and 420b. The resulting diverging beams 440 and 450, consequently enter the second micro-lens 430, which is also shifted off-axis from the light sources and micro-lenses. The second lens micro-lens 430 increases the deflection angle of each diverging light beam, and collimates the diverging beams 460 and 470. Individually, each light source interacts with a first and second lens, similar to the configuration in FIG. 3B. However, the present configuration enables the beam expansion with a reduced number of total micro-lens arrays. In addition, the present configuration greatly increases the field of illumination that may be realized.

In these embodiments, light sources 410a and 410b may form a single light source array, or may be separate light source arrays, each having one or more light sources producing beams, 440 and 450. In this and other embodiments disclosed herein, each light source array may comprise a plurality of subsets of light sources that, are each offset in position relative to a principal axis of a micro-lens in the micro-lens array. The light sources may propagate beams substantially parallel to a principal axis of its respective micro-lens in the micro-lens array, and each emitted light beam passes through the one or more micro-lenses in a different direction, forming the resulting field of illumination. Like other embodiments, each light source may be electrically connected or independent, and driven accordingly to produce a desired field of illumination.

Figure 5:
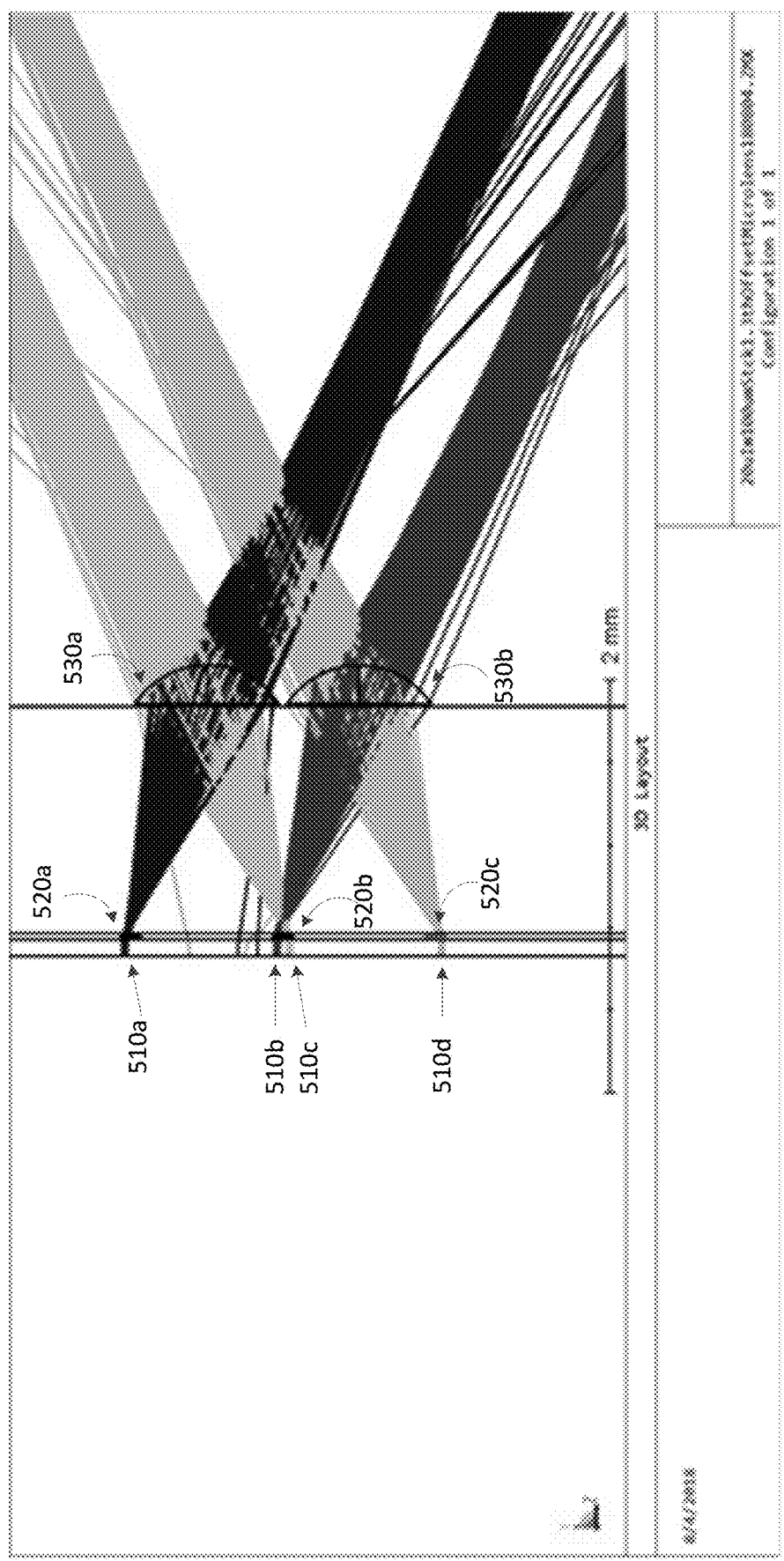
FIG. 5 illustrates a light source array and micro-lens configuration in accordance with an embodiment.

FIG. 5 illustrates the use of four light sources 510a, 510b, 510c and 510d, each aligned off-axis with a principal axis of a first micro-lens 520a, 520b and 520c, with sources 510b and 510c sharing the same micro-lens as depicted in FIG. 2. The first micro-lenses, 520a, 520b and 520c, are each shifted off-axis to a second lens array with micro-lenses 530a and 530b. In embodiments, micro-lenses, 510a,510b and 510c form a first micro-lens array, and second micro-lenses 530a and 530b form a second micro-lens array. While the depicted embodiments illustrate first micro-lens array comprising three micro-lenses, and a second micro-lens array comprising two micro-lenses, it will be appreciated that arrays in accordance with the present disclosure may comprise two or more micro-lenses in any 1- or 2-D configuration. In addition, each light source may be a VCSEL array or other surface-emitting laser array.

The depicted configuration illustrates multiplexing across both sets of micro-lenses and is exemplary of a plurality of configurations utilizing two or more light sources and micro-lenses to generate a greater field of illumination. By combining example embodiments from FIGS. 3A-B and 4, FIG. 5 demonstrates how a plurality of light sources and micro-lens arrays may generate multiple illumination zones, which may be independently and/or sequentially driven.

Figure 6:
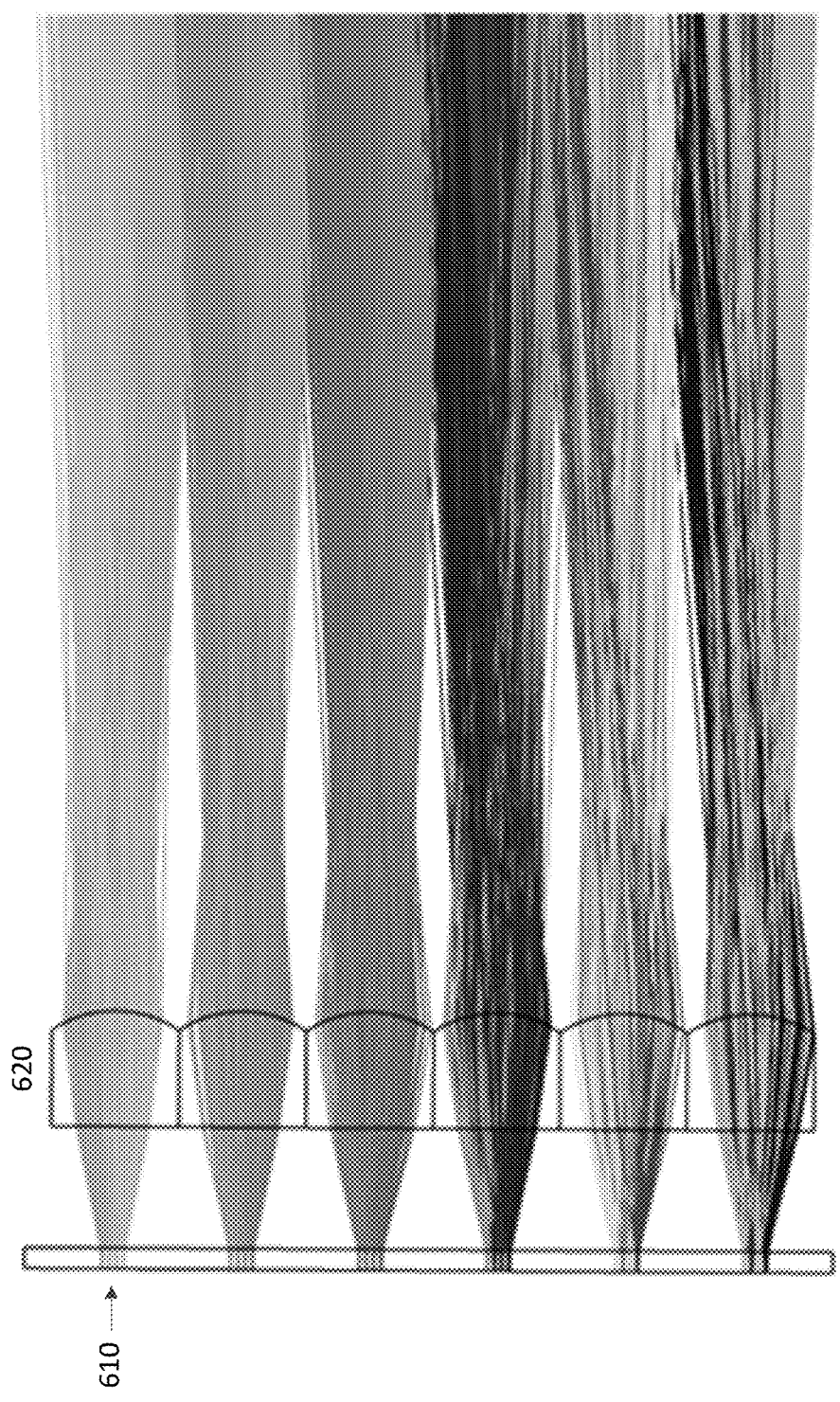
FIG. 6 illustrates a light source and micro-lens configuration generating a combined beam output, in accordance with an embodiment.

FIG. 6 illustrates an embodiment, comprising six subsets of four light sources each, i.e., light source arrays 610, wherein each subset of light sources pass through separate micro-lenses. Each set of four light sources may be directed towards a first micro-lens 620 so that the output of each lens is shifted in the far-field.

Each light source in a light source array 610 may be aligned on axis or off-axis to a principal axis of the micro-lens 620 as disclosed herein so that a light source transmitting through one micro-lens of the array 620 is aligned with a light source transmitting through a different micro-lens in the array 620 to propagate in the same angular position. A plurality of light beams propagating in different angular directions can be formed with light contributed from different sources to increase the available optical power in each beam from a very compact source. Thus, the combined beam comprises light beams from the same or different subsets of light sources in the light source array. Alternatively, each source can be positioned relative to the corresponding micro-lens so that a separate beam is formed from each source.

In embodiments, the micro-lenses may be any of a plurality of types of lenses, such as cylinder lenses, and the amount of offset between the light beams and lenses may be adjusted to result in the desired field of illumination. Multiple beams projected in the far-field can be independent or combined such that output of a plurality of rows may overlap in each line 650 and result in higher power per line. Multiple lines or illumination zones can be realized by turning on the sources in combination.

Figure 7:
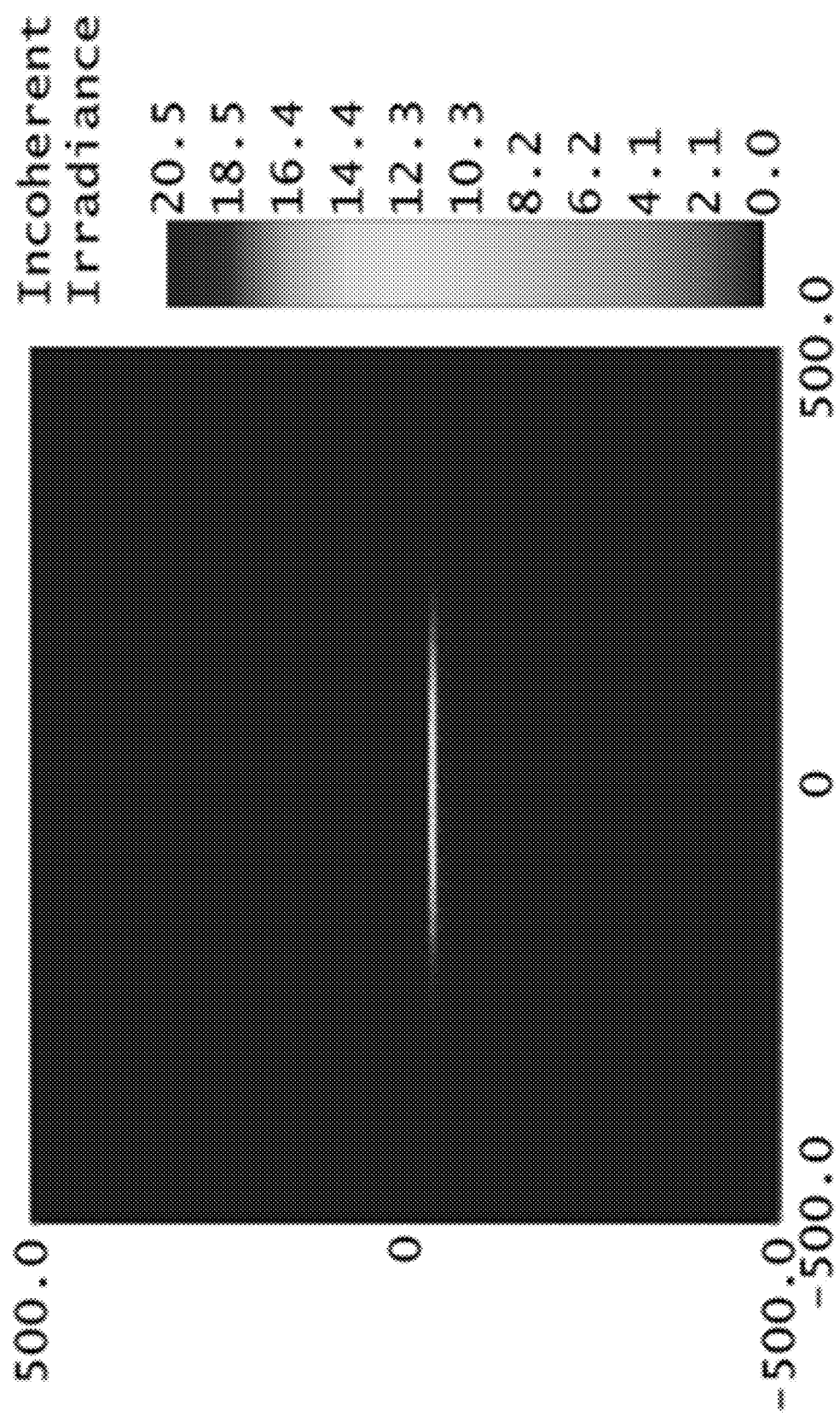
FIG. 7 illustrates irradiance from combined beam outputs, in accordance with an embodiment.

This concept is illustrated in FIG. 7, which depicts an example single line output from the configuration of FIG. 6. The output indicates irradiance, generated from contributions from a single row of light sources emitting through a single lens in the array of cylinder lenses 620. All the combined sources and lenses in the embodiment will produce 24 illumination lines in the far field. An alternative configuration could produce fewer lines in the far-field by having more than one row of sources have the same offset to the optical axis of its corresponding micro-lens to propagate multiple beams in the same angular direction.

FIG. 7 illustrates only one example of a line output in accordance with the design of FIG. 6, although other combination of light sources and lenses can produce similar lines at varying vertical positions. In addition, it will be appreciated that while the present example of FIG. 6 depicts 24 light sources (4 light sources×6 subsets), and six subsets of lens arrays, other configurations of light sources and lens arrays may be utilized to accomplish specific spatial multiplexing goals and illumination areas.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A spatially multiplexed optical system comprising:
    an array of light sources comprising a plurality of subsets of light sources; and
    an array of micro-lenses aligned to the array of light sources such that each subset of the subsets of light sources among the array of light sources is offset in a position relative to a principal axis of a receiving micro-lens among the array of micro-lenses, and emitted light beams propagate substantially parallel to a principal axis of the array of micro-lenses,
        wherein for each subset of light sources, emitted light beams propagate through a same respective micro-lens among the array of micro-lenses and diverge in different directions,
        wherein at least two or more subsets of light sources are aligned to a same micro-lens in the array of micro-lenses, and
        wherein one or more light beams from different subsets of light sources form a combined beam after propagating through the array of micro-lenses.

2. The spatially multiplexed optical system of claim 1, wherein at least one subset of light sources among the array of light sources is electrically connected independently of one or more other subsets of light sources in the array of light sources.

3. The spatially multiplexed optical system of claim 1, wherein multiple subsets of the plurality of subsets of light sources in the array of light sources are independently illuminated sequentially and propagate emitted light beams through the same micro-lens in different directions.

4. The spatially multiplexed optical system of claim 1, wherein at least one light source in each subset of light sources is electrically connected independently of one or more other light sources the same subset of light sources, and independent light sources from two or more subsets of light sources are sequentially illuminated to propagate light in the same beam direction, through different micro-lenses of the array of micro-lenses.

5. The spatially multiplexed optical system of claim 1, wherein the at least two or more subsets of light sources are aligned to the same micro-lens such that resulting light beams are deflected in opposite directions.

6. The spatially multiplexed optical system of claim 1, wherein a light source, of the array of light sources, is positioned less than 0.1 mm from a corresponding micro-lens of the array of micro-lenses.

7. A spatially multiplexed optical system, comprising:
    a light source array;
    a first micro-lens array configured to receive and expand light beams emitted from the light source array,
        wherein each light source of the light source array is offset in position relative to a principal axis of a corresponding micro-lens in the first micro-lens array,
        wherein for each light source, emitted light beams propagate through a same respective micro-lens among the first micro-lenses array and diverge in different directions,
        wherein at least two or more light sources of the light source array are aligned to a same micro-lens in the first micro-lens array, and
        wherein one or more light beams from different light sources form a combined beam after propagating through the first array of micro-lenses; and
    a second micro-lens array positioned behind the first micro-lens array and configured to receive the expanded light beams and to reduce further beam divergence of the expanded light beams,
        wherein a plurality of micro-lenses in the second micro-lens array are offset in position relative to principal axes of micro-lenses in the first micro-lens array and the second micro-lens array alters a direction of the emitted light beams from the first micro-lens array.

8. The spatially multiplexed optical system of claim 7, wherein multiple light sources in the light source array are electrically connected independently of other light sources in the light source array.

9. The spatially multiplexed optical system of claim 7, wherein multiple light sources in the light source array are independently illuminated such that emitted light beams sequentially propagate through the first micro-lens array and second micro-lens array in different directions.

10. The spatially multiplexed optical system of claim 7, wherein
    the light source array comprises a plurality of subsets of light sources;
    the first micro-lens array is aligned to the light source array such that each subset of light sources is offset in position relative to a principal axis of a micro-lens in the first micro-lens array; and
    for each subset of light sources, emitted light beams propagate from a normal axis of each light source in each subset of light sources through a same micro-lens of the first micro-lens array, diverge in different directions, and are received by a micro-lens in the second micro-lens array.

11. The spatially multiplexed optical system of claim 10, wherein one or more light beams from different subsets of light sources form a combined beam after propagating through the second micro-lens array.

12. The spatially multiplexed optical system of claim 10, wherein each subset of light sources comprises a similar positioning of light sources relative to a corresponding micro-lens of the first micro-lens array and micro-lens of the second micro-lens array.

13. The spatially multiplexed optical system of claim 10, wherein the light beams propagate through different micro-lenses in the first micro-lens array and different micro-lenses in the second micro-lens array, and contribute power in the same light beam direction.

14. The spatially multiplexed optical system of claim 7, wherein the at least two or more light sources are aligned to the same micro-lens such that resulting light beams are deflected in opposite directions.

15. The spatially multiplexed optical system of claim 7, wherein a light source, of the light source array, is positioned less than 0.1 mm from a corresponding micro-lens of the first micro-lens array.

16. The spatially multiplexed optical system of claim 7, wherein a distance between the first micro-lens array and the second micro-lens array is over 1 mm.

17. A method for spatially multiplexing optical signals, comprising:
  emitting and expanding light beams from an array of light sources through a first micro-lens array,
    wherein each light source of the array of light sources is offset in position relative to a principal axis of a corresponding micro-lens in the first micro-lens array,
    wherein for each light source, emitted light beams propagate through a same respective micro-lens among the first micro-lenses array and diverge in different directions,
    wherein at least two or more light sources of the array of light sources are aligned to a same micro-lens in the first micro-lens array, and
    wherein one or more light beams from different light sources form a combined beam after propagating through the first array of micro-lenses;
  receiving the expanded light beams at a second micro-lens array, the second micro-lens array positioned behind the first micro-lens array and offset relative to principal axes of micro-lenses in the first micro-lens array;
  reducing divergence of the expanded light beams passing through the second micro-lens array; and
  altering a direction of light beams emitted from the second micro-lens array.

18. The method of claim 17, further comprising:
  independently connecting a plurality of light sources in the array of light sources; and
  independently illuminating some light sources in the plurality of light sources such that emitted light beams sequentially propagate through the first micro-lens array and second micro-lens array lenses in different directions.

19. The method of claim 17, wherein the at least two or more light sources are aligned to the same micro-lens such that resulting light beams are deflected in opposite directions.

20. The method of claim 17, wherein a light source, of the array of light sources, is positioned less than 0.1 mm from a corresponding micro-lens of the first micro-lens array.

* * * * *